US012691910B2

(12) United States Patent　　(10) Patent No.:　US 12,691,910 B2

Raichelgauz　　(45) Date of Patent:　Jul. 28, 2026

(54) JOINT SIGNATURE-VIRTUAL FIELD REPRESENTATION

(71) Applicant: AUTOBRAINS TECHNOLOGIES LTD, Tel Aviv-Jaffa (IL)

(72) Inventor: Igal Raichelgauz, Tel Aviv (IL)

(73) Assignee: AUTOBRAINS TECHNOLOGIES LTD, Tel Aviv (IL)

( * ) Notice: Subject to any disclaimer, the term of this patent is extended or adjusted under 35 U.S.C. 154(b) by 101 days.

(21) Appl. No.: 18/808,176

(22) Filed: Aug. 19, 2024

(65) Prior Publication Data

US 2026/0048765 A1　　Feb. 19, 2026

(51) Int. Cl.
B60W 60/00　　(2020.01)
B60W 50/00　　(2006.01)

(52) U.S. Cl.
CPC .. B60W 60/00274 (2020.02); B60W 50/0097 (2013.01); *B60W 2554/4045* (2020.02); *B60W 2554/4046* (2020.02)

(58) Field of Classification Search
CPC ....... B60W 60/00274; B60W 50/0097; B60W 2554/4045; B60W 2554/4046
See application file for complete search history.

(56) References Cited

U.S. PATENT DOCUMENTS

| | | | | |
|---|---|---|---|---|
| 11,623,658 | B1 * | 4/2023 | Charland | G01S 17/66 701/23 |
| 11,906,974 | B2 * | 2/2024 | Davis | G05D 1/0238 |

| | | | | |
|---|---|---|---|---|
| 12,258,008 | B1 * | 3/2025 | Kurutach | B60W 60/0011 |
| 12,406,395 | B2 * | 9/2025 | Naveh | G06T 7/70 |
| 12,409,859 | B1 * | 9/2025 | Burlina | B60W 30/09 |
| 12,456,292 | B2 * | 10/2025 | Kim | G06V 10/764 |
| 12,511,992 | B2 * | 12/2025 | Unzueta | G08G 1/0141 |
| 12,525,025 | B1 * | 1/2026 | Burlina | G06V 20/58 |
| 2019/0382007 | A1 * | 12/2019 | Casas | B60W 30/0956 |
| 2020/0320878 | A1 * | 10/2020 | Ljung Aust | G08G 1/005 |
| 2021/0110552 | A1 * | 4/2021 | Bhat | G06T 7/70 |
| 2021/0347383 | A1 * | 11/2021 | Siebert | G01C 21/3407 |
| 2022/0044149 | A1 * | 2/2022 | Rand | G06N 20/00 |
| 2022/0092366 | A1 * | 3/2022 | Chiu | G06N 3/0464 |
| 2022/0153275 | A1 * | 5/2022 | Raichelgauz | B60W 60/001 |
| 2022/0163974 | A1 * | 5/2022 | Davis | G05D 1/0238 |
| 2022/0355802 | A1 * | 11/2022 | Chaves | B60W 40/09 |
| 2023/0154195 | A1 * | 5/2023 | Agarwal | G06V 20/588 382/103 |
| 2023/0311882 | A1 * | 10/2023 | VanBlon | B60L 3/0076 701/22 |
| 2023/0331229 | A1 * | 10/2023 | VanBlon | B60W 50/10 |
| 2023/0339502 | A1 * | 10/2023 | Chi-Johnston | G06N 20/00 |
| 2023/0360532 | A1 * | 11/2023 | Stenneth | G08G 1/165 |

(Continued)

*Primary Examiner* — Tyler J Lee

(74) *Attorney, Agent, or Firm* — RECHES PATENTS

(57)　　　　　ABSTRACT

A method of joint signature-virtual field representation of road elements for driving, the method includes receiving, at a machine learning process associated with a vehicle, multiple sensed information units representing a road element captured at different points of time; generating, by the machine learning process, a joint representation of the road element accounting for a class indication of the road element and of a virtual field indication of an impact of the road element on the vehicle; and determining in real time in a driving of the vehicle, based on the joint representation, a driving related output affecting the vehicle.

14 Claims, 3 Drawing Sheets

(56)     References Cited

U.S. PATENT DOCUMENTS

| | | | |
|---|---|---|---|
| 2024/0149888 A1* | 5/2024 | Tomoschuk | B60W 50/0098 |
| 2024/0152150 A1* | 5/2024 | Davis | G05D 1/0238 |
| 2024/0152734 A1* | 5/2024 | Ye | B60W 50/0098 |
| 2024/0169740 A1* | 5/2024 | Fowe | G06V 10/26 |
| 2024/0169741 A1* | 5/2024 | Fowe | G06T 7/20 |
| 2024/0208492 A1* | 6/2024 | Chilton | B60W 30/0956 |
| 2024/0217530 A1* | 7/2024 | Martin Bragado | B60W 50/0205 |
| 2025/0068960 A1* | 2/2025 | Yu | G06N 3/08 |
| 2025/0078440 A1* | 3/2025 | Unzueta | G06T 7/50 |
| 2025/0078651 A1* | 3/2025 | Unzueta | G08G 1/0141 |
| 2025/0208965 A1* | 6/2025 | Gokhale | G06F 11/27 |
| 2025/0297862 A1* | 9/2025 | Rajendran | G05B 19/042 |

* cited by examiner

Vehicle 400

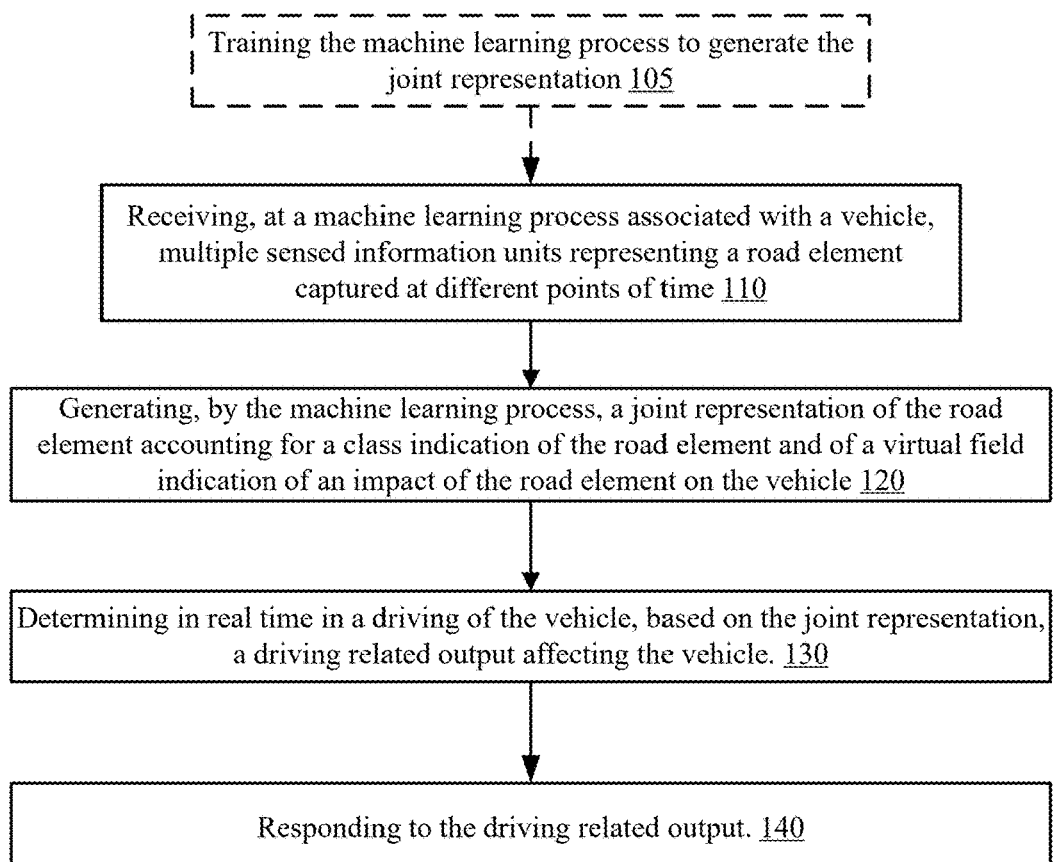

Training the machine learning process to generate the joint representation 105

Receiving, at a machine learning process associated with a vehicle, multiple sensed information units representing a road element captured at different points of time 110

Generating, by the machine learning process, a joint representation of the road element accounting for a class indication of the road element and of a virtual field indication of an impact of the road element on the vehicle 120

Determining in real time in a driving of the vehicle, based on the joint representation, a driving related output affecting the vehicle. 130

Responding to the driving related output. 140

100

FIG. 2

JOINT SIGNATURE-VIRTUAL FIELD REPRESENTATION

BACKGROUND

Autonomous vehicles that are equipped advanced driver assistance systems (ADAS) are required to accurately detect road elements and to determine how to respond to the detection of the road elements.

There is a growing need to detect road elements and to determine how to respond to the detection of the road elements.

SUMMARY

A method, system and non-transitory computer readable medium as illustrated in the application.

A BRIEF DESCRIPTION OF THE DRAWINGS

Figure 1:
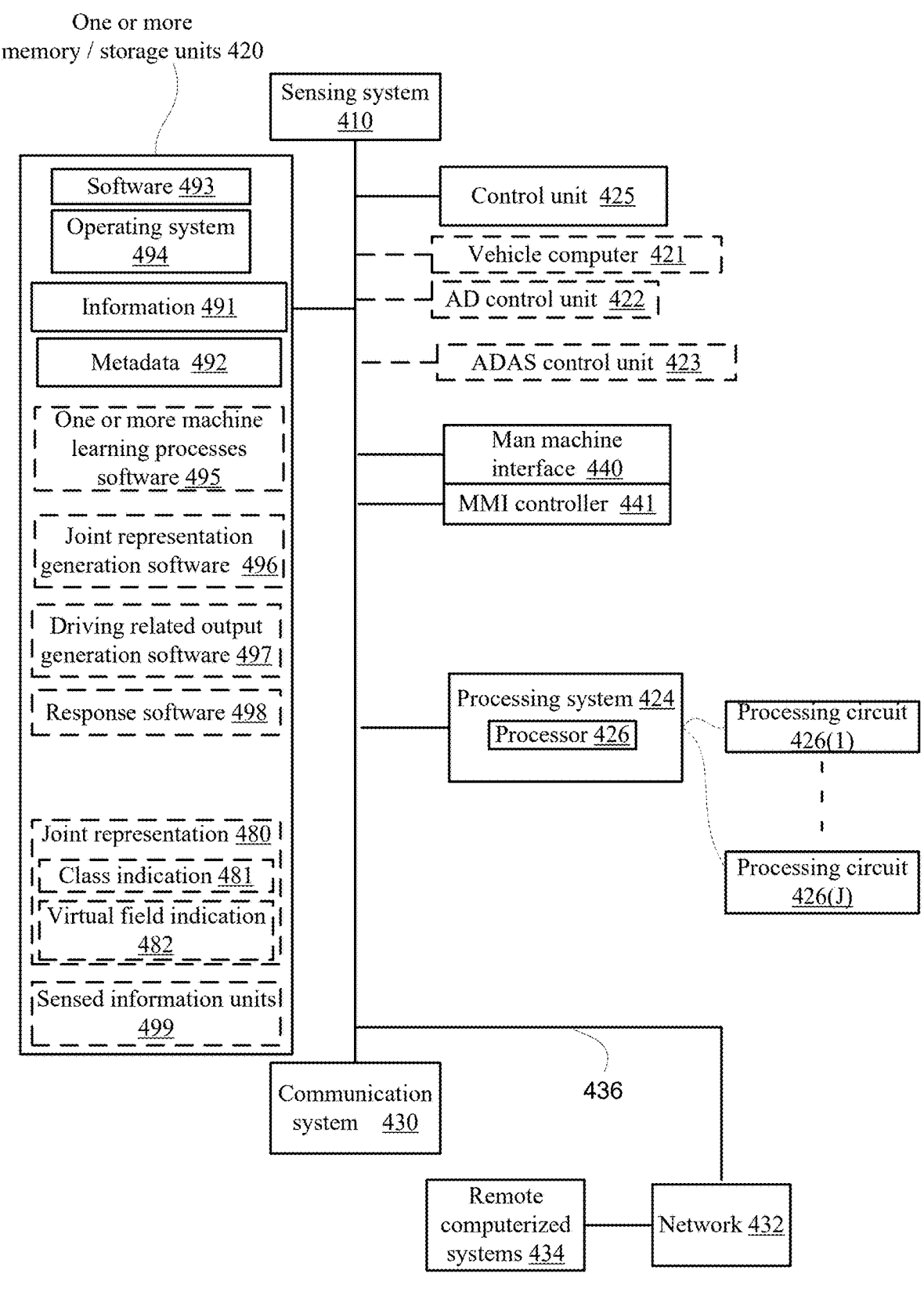
Figure 3:
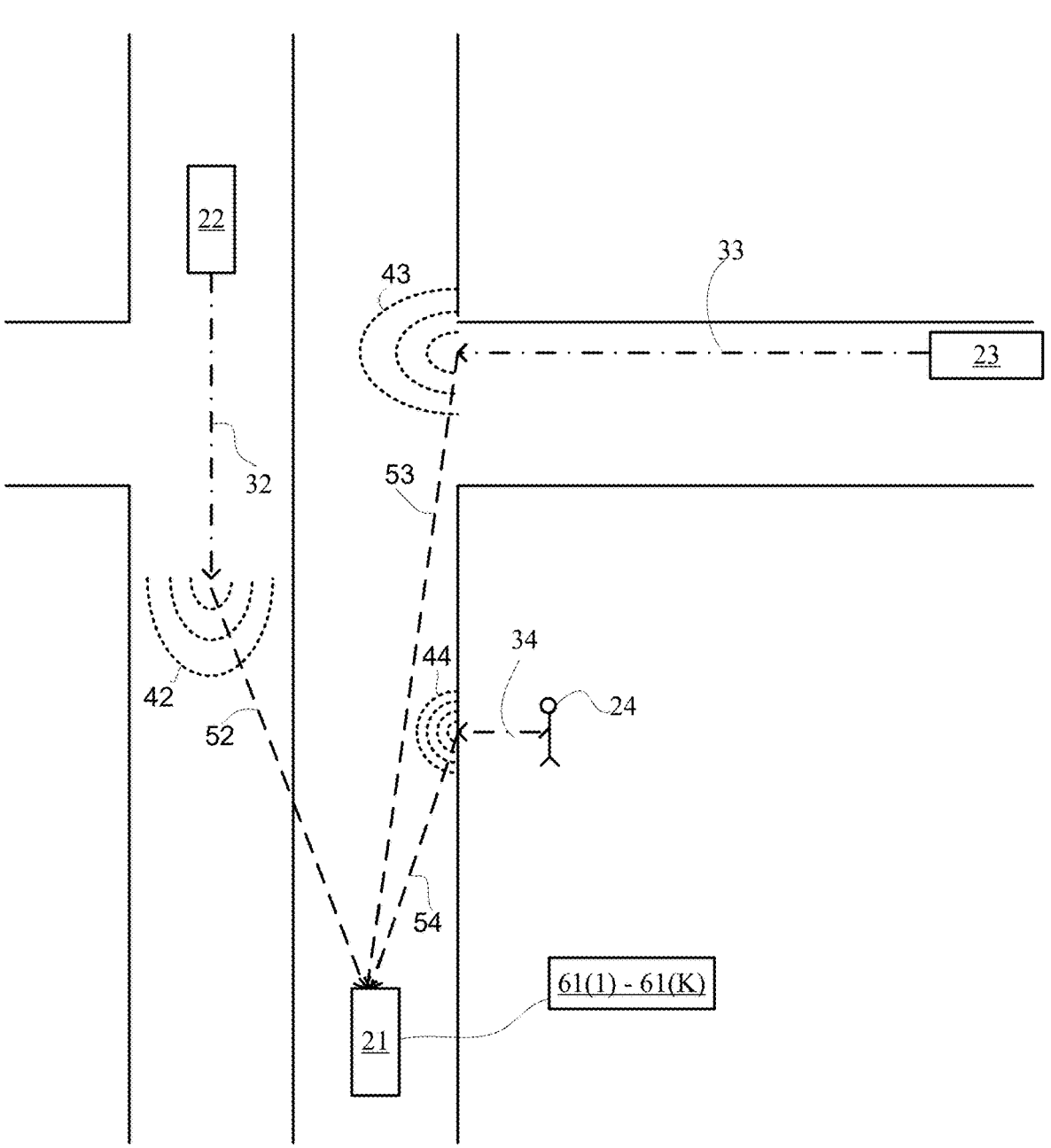

The embodiments of the disclosure will be understood and appreciated more fully from the following detailed description, taken in conjunction with the drawings in which:

FIG. 1 illustrates an example of a vehicle;
FIG. 2 illustrates an example of a method; and
FIG. 3 illustrates examples of road element, virtual fields and virtual force fields.

DETAILED DESCRIPTION

The different figures illustrates examples of units and/or software and/or information items and/or steps and/or components. These examples are provided for brevity of explanation. At least one of the units and/or software and/or information items and/or steps and/or components is optional or mandatory.

According to an embodiment there is provided a method, a non-transitory computer readable medium and a computerized system for joint signature-virtual field representation of road elements for driving, the method includes (a) receiving, at a machine learning process associated with a vehicle, multiple sensed information units representing a road element captured at different points of time; (b) generating, by the machine learning process, a joint representation of the road element accounting for a class indication of the road element and of a virtual field indication of an impact of the road element on the vehicle; and (c) determining in real time in a driving of the vehicle, based on the joint representation, a driving related output affecting the vehicle.

According to an embodiment—a virtual force field—especially in relation to road elements may be determined based on one or more virtual fields of one or more road elements.

Virtual fields are properties of road elements that are virtually "sensed" through a control system of the ego vehicle in the form of ADAS and/or AV software. The virtual fields are defined as a mathematical function which depend on spatial positions and/or kinematic information of the road elements. Each virtual field virtually applies a virtual force on the vehicle (also referred to as an ego vehicle).

The virtual forces virtually applied by the road elements on the ego vehicle are determined by applying a virtual physical model (for example a mechanics model or an electromagnetic model) on the virtual fields.

A total virtual force applied on the vehicle—is determined based on one or more virtual forces associated with the one or more elements. For example, by calculating a vector weighted sum (or other function) on the one or more virtual forces associated with the one or more road elements. The virtual force field mentioned above is determined based on the total virtual force, to be a desired (or target) virtual acceleration—for example, based on the equivalent of Newton's second law. The desired virtual acceleration may be a vector—or otherwise have a direction.

A virtual field indication is indicative of the virtual field.

An example of a virtual force field is illustrated in U.S. patent application Ser. No. 18/350,684 of Biess et al which is incorporated herein by reference.

According to an embodiment, the machine learning process is implemented by at least one narrow artificial intelligence agent. An example of narrow artificial intelligence agents is illustrated in U.S. patent application Ser. Nos. 17/817,928 and 18/036,150 of Raichelgauz et al which are incorporated herein by reference.

According to an embodiment, using a joint signature-virtual field representation of road elements increases the robustness of the method in the sense that it includes a class indication and a virtual field indication—which better identifies the road element.

Furthermore—the usage of the class indication and the virtual field indication allows to ignore road elements that exhibit an expected class but have an erroneous virtual field indication—for example ignoring a pedestrian that has an impact of a truck.

In addition—the joint signature-virtual field representation consumes less memory space and fewer input-output operations—especially when stored in single memory entry or in consecutive memory addresses—in comparison to different accesses to classification information and impact information stored at different data structures.

According to an embodiment, using a joint signature-virtual field representation of road elements increases the robustness is more accurate—especially when the representation is generated by a training process that imposes both a classification loss and a virtual field loss—in order to take into account both classification and virtual field metadata.

According to an embodiment, real time means within less than 1 till 2 seconds or within a fraction of a second, or within a one tenth of a second, or less than 5-15 seconds, and the like.

FIG. 1 illustrates an example of a vehicle 400.

Vehicle 400 includes a man machine interface 440 having or being in communication with man machine interface (MMI) controller 441, a communication system 430, one or more memory and/or storage units 420, a processing system 424 including processor 426. The communication system 430, the one or more memory and/or storage units 420, and the processing system 424 may belong to a computerized system of vehicle 400. The computerized system may be a server, a laptop, a desktop or any other computer and may include or be in communication with a sensing unit and/or a controller.

According to an embodiment, vehicle 400 is in communication with network 432 and one or more other remote computerized systems 434 that are in communication with network 432. An example of a remote computerized system is a server or one or more computers having access to a storage system that stores items related to one or more portions of one or more groups of neural networks—at least some of which are not currently stored in the vehicle.

According to an embodiment, the communication system 430 is configured to enable communication between the one or more memory and/or storage units 420 and/or any one of the additional units and/or the network 432 (that is in communication with the remote computerized systems). Communication system 430 is also configured to enable communication with other elements such as sensing system 410, man machine interface 440, control unit 425, vehicle computer 421, autonomous driving control unit 422 (denoted AD control unit), advanced driver assistance system (ADAS) control unit 423 (denoted ADAS control unit), and the like.

The memory and/or storage units 420 was shown as storing software. Any reference to software should be applied mutatis mutandis to code and/or firmware and/or instructions and/or commands, and the like.

Processor 426 includes a plurality of processing units 426(1)-426(J), J is an integer that exceeds one. Any reference to one unit or item should be applied mutatis mutandis to multiple units or items. For exampleany reference to processor should be applied mutatis mutandis to multiple processors, any reference to communication system 430 should be applied mutatis mutandis to multiple communication systems.

According to an embodiment, the one or more memory and/or storage units 420 includes one or more memory unit, each memory unit may include one or more memory banks.

According to an embodiment, the one or more memory and/or storage units 420 includes a volatile memory and/or a non-volatile memory. The one or more memory and/or storage units 420 may be a random-access memory (RAM) and/or a read only memory (ROM).

According to an embodiment, the non-volatile memory unit is a mass storage device, which can provide non-volatile storage of computer code, computer readable instructions, data structures, program modules, and other data for the processor or any other unit of vehicle. For example, and not meant to be limiting, a mass storage device can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Content may be stored in any form, format, type, and/or in any part or any type of the memory and/or storage units.

According to an embodiment, content may be stored in one or more databases of a memory unit. A database may be any database known and unknown in the art, including for example DB2®, Microsoft® Access, Microsoft® SQL Server, Oracle®, mySQL, PostgreSQL, and the like.

The memory and/or storage units 420 are configured to store firmware and/or software, one or more operating systems, data and metadata required to the execution of any of the methods mentioned in this application.

The memory and/or storage units 420 was shown as storing software. Any reference to software should be applied mutatis mutandis to code and/or firmware and/or instructions and/or commands, and the like.

Various units and/or components are in communication with each other using any communication elements and/or protocols. An example of a communication system is denoted 430. Other communication elements may be provided.

The communication system 430 may be in communication with bus 436. The bus represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus, and all buses specified in this description can also be implemented over a wired or wireless network connection and each of the subsystems.

Network 432 that is located outside the vehicle and is used for communication between the vehicle and at least one remote computing system. By way of example, a remote computing system can be a personal computer, a laptop computer, portable computer, a server, a router, a network computer, a peer device or other common network node, and so on. Logical connections between the processor and either one of remote computing systems can be made via a local area network (LAN) and a general wide area network (WAN). Such network connections can be through a network adapter (may belong to communication system 430) which can be implemented in both wired and wireless environments. Such networking environments are conventional and commonplace in offices, enterprise-wide computer networks, intranets, and a larger network such as the internet.

It should be noted that at least a part of the content illustrated as being stored in one or more memory/storage units 420 may be stored outside the vehicle. It should also be noted that the processor may evaluate signatures generated by a plurality of detectors.

According to an embodiment, the memory and/or storage units 420 stores at least one of: operating system 494, information 491 such as sensed information units 499, metadata 492, and software 493.

Examples of software includes:
A. One or more machine learning processes software 495.
B. Joint representation generation software 496.
C. Driving related output generation software 497.
D. Response software 498.

It should be noted that the one or more machine learning processes software 495 may replace the joint representation generation software 496 and/or the driving related output generation software 497.

FIG. 1 also illustrates information and/or metadata such as:
A. Sensed information units 499.
B. Joint representation 480 of a road element-including class indication 481 and virtual field indication 482.

The control unit 425 may cooperate with ADAS control unit 423 and/or with AD control unit 422 and/or may control or communicate with other vehicle components—including vehicle computer The ADAS control unit 423 is configured to control ADAS operations.

The AD control unit 422 is configured to control autonomous driving of the autonomous vehicle.

The vehicle computer 421 is configured to control the operation of the vehicle-especially controlling the engine, the transmission, and any other vehicle system or component.

The vehicle computer 421 may be in communication with an engine control module, a transmission control module, a powertrain control module, and the like.

The sensing system 410 may include optics, a sensing element group, a readout circuit, and an image signal processor. Optics are followed by a sensing element group such as line of sensing elements or an array of sensing elements that form the sensing element group. The sensing element group is followed by a readout circuit that reads detection signals generated by the sensing element group. An image signal processor is configured to perform an initial processing of the detection signals—for example by improving the quality of the detection information, performing noise reduction, and the like. The sensing system 410 is configured to output one or more sensed information units (SIUs).

Control unit 425 is configured to control the operation of the sensing system 410, and/or the one or more memory and/or storage units 420 and/or the one or more additional units (except the controller).

By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information, and which can be accessed by a computer.

Any content may be stored in any part or any type of memory and/or storage units.

According to an embodiment, at least one memory unit stores at least one database—such as any database known in the art—such as DB2®, Microsoft® Access, Microsoft® SQL Server, Oracle®, mySQL, PostgreSQL, and the like.

Various units and/or components are in communication with each other using any communication elements and/or protocols. An example of a communication system is denoted 430. Other communication elements may be provided.

According to an embodiment, processing system 424 is configured to perform, while executing software:

A. Receiving, at a machine learning process (implemented at least in part by the processing system) associated with a vehicle, multiple sensed information units representing a road element captured at different points of time.

B. Generate, by the machine learning process, a joint representation of the road element accounting for a class indication of the road element and of a virtual field indication of an impact of the road element on the vehicle.

C. Determine in real time in a driving of the vehicle, based on the joint representation, a driving related output affecting the vehicle. The determining uses a mapping implemented by the machine learning process and being learnt during training.

D. Respond to the driving related output.

Any method illustrated in the application is executable by a processor and/or processing circuit (also referred to as a processing circuitry)—an example of which is illustrated in FIG. 1.

FIG. 2 illustrates an example of method 100.

According to an embodiment, method 100 starts by step 110 of receiving, at a machine learning process associated with a vehicle, multiple sensed information units representing a road element captured at different points of time.

For example—step 110 includes receiving images that were acquired at a rate of a few (between 1 and 6) tens of images per second. Any other type of sensed information units may be provided—for example radar information units, sonar information units, acoustic information units, thermal information units, and the like.

According to an embodiment, the machine learning process is being trained using a classification loss and a virtual field loss.

According to an embodiment, method 100 includes step 105 of training the machine learning process to generate the joint representation.

According to an embodiment, step 110 is followed by step 120 of generating, by the machine learning process, a joint representation of the road element accounting for a class indication of the road element and of a virtual field indication of an impact of the road element on the vehicle.

According to an embodiment the joint representation is a signature or an embedding or a signature of an embedding or be generated using cropped images. Examples of generating signatures and/or cropping images are provided in U.S. patent application Ser. No. 18/527,701 which is incorporated herein by reference.

According to an embodiment, the class indication is distinguishable from the virtual field indication. This eases the processing of the joint representation—especially when there is a need to process in parallel the different indications.

According to an embodiment, step 120 is followed by step 130 of determining in real time in a driving of the vehicle, based on the joint representation, a driving related output affecting the vehicle. The determining uses a mapping implemented by the machine learning process and being learnt during training.

According to an embodiment, step 130 is followed by step 140 of responding to the driving related output.

According to an embodiment the driving related output is a driving related decision with respect to the vehicle.

According to an embodiment step 140 the responding includes at least one of:

A. Triggering an execution of the driving related decision.

B. Requesting a vehicle computer to execute the driving related decision.

C. Requesting an ADAS control unit of the vehicle to execute the driving related decision.

D. Requesting an AD control unit of the vehicle to execute the driving related decision.

E. Instructing a vehicle computer to execute the driving related decision.

F. Instructing an ADAS control unit of the vehicle to execute the driving related decision.

G. Instructing an AD control unit of the vehicle to execute the driving related decision H. Transmitting the driving related decision to a remote computerized system.

I. Transmitting the driving related decision to the vehicle computer.

J. Transmitting the driving related decision to the ADAS control unit.

K. Transmitting the driving related decision to the AD control unit/

L. Storing the driving related decision in one or more memory/storage unit.

M. Performing or requesting or instructing an emergency braking.

According to an embodiment, step 140 includes executing the driving related decision.

According to an embodiment, the driving related output is a prediction indication with respect to a behavior of the road element.

FIG. 3 illustrates an example of:

A. Ego vehicle 21.

B. First vehicle 22 driving in an opposite direction to the ego vehicle and passing a first vehicle path 32 during an acquisition of multiple sensed information units 61(1)-61(K), K is an integer that exceeds one. When reaching the end of first vehicle path 32 the first vehicle generates a first vehicle field 42 that applies a first vehicle virtual force 52 on the ego vehicle.

C. Second vehicle 23 driving in a perpendicular direction to the ego vehicle and passing a second vehicle path 33 during an acquisition of multiple sensed information units. When reaching the end of second vehicle path 33 the second vehicle generates a second vehicle field 43 that applies a second vehicle virtual force 53 on the ego vehicle.

D. Pedestrian 24 walking in a perpendicular direction to the ego vehicle and passing a pedestrian path 34 during an acquisition of multiple sensed information units. When reaching the end of pedestrian path 34 the pedestrian generates a pedestrian field 44 that applies a pedestrian virtual force 54 on the ego vehicle.

In the foregoing detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarding the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

Any one unit or module described herein, may be implemented in hardware and/or code, instructions and/or commands stored in a non-transitory computer readable medium, may be included in a vehicle, outside a vehicle, in a mobile device, in a server, and the like.

The vehicle may be any type of vehicle—such as a ground transportation vehicle, an airborne vehicle, or a water vessel.

The specification and/or drawings may refer to an image. An image is an example of sensed information. Any reference to an image may be applied mutatis mutandis to any type of natural signal such as but not limited to signal generated by nature, signal representing human behavior, signal representing operations related to the stock market, a medical signal, financial series, geodetic signals, geophysical, chemical, molecular, textual and numerical signals, time series, and the like. Any reference to a media unit may be applied mutatis mutandis to sensed information. The sensed information may be of any kind and may be sensed by any type of sensors—such as a visual light camera, an audio sensor, a sensor that may sense infrared, radar imagery, ultrasound, electro-optics, radiography, LIDAR (light detection and ranging), etc. The sensing may include generating samples (for example, pixel, audio signals) that represent the signal that was transmitted, or otherwise reach the sensor.

The specification and/or drawings may refer to a processor. The processor may be a processing circuitry (also referred to as a processing circuit). The processing circuitry may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the specification and/or drawings may be provided.

Any reference to an object may be applicable to a pattern. Accordingly-any reference to object detection is applicable mutatis mutandis to a pattern detection.

A situation may be a singular location, or optionally a combination of properties identified at a specified point in time. A scenario is a series of events that follow logically within a causal frame of reference. Any reference to a scenario should be applied mutatis mutandis to a situation.

The sensed information unit may be sensed by one or more sensors of one or more types. The one or more sensors may belong to the same device or system—or may belong to different devices of systems.

I claim:

1. A method of joint signature-virtual field representation of road elements for driving, the method comprising:

receiving, at a machine learning process associated with a vehicle, multiple sensed information units representing a road element captured at different points of time;

generating, by the machine learning process, a joint representation of the road element that is a single unified representation that simultaneously encodes both a class indication of the road element and of a virtual field indication of an impact of the road element on the vehicle; wherein the virtual field indication represents a virtual force virtually applied by the road element on the vehicle based on a virtual physical model; wherein the class indication is distinguishable from the virtual field indication;

determining in real time in a driving of the vehicle, based on the joint representation, a driving related output affecting the vehicle, wherein the driving related output is a driving related decision with respect to the vehicle; wherein the determining of the driving related output comprises: (a) determining the virtual force virtually applied by the road element on the vehicle, (b) determining, based the virtual force, a virtual acceleration applied on the vehicle by the road element, (d) determining a desired acceleration of the vehicle based, at least in part, on the virtual acceleration applied on the vehicle by the road element, wherein the driving related output is used to have the vehicle autonomously drive at the desired acceleration; and autonomously driving the vehicle by executing the driving related decision.

2. The method according to claim 1, wherein the machine learning process being trained using a classification loss and a virtual field loss.

3. The method according to claim 1, comprising training the machine learning process to generate the joint representation.

4. The method according to claim 1, comprising ignoring the joint representation of the road element when the class indication indicates that the road element is of a given class that has an impact on the vehicle that does not match the impact on the vehicle that is indicated by the virtual field indication.

5. The method according to claim 1, comprising storing the virtual field indication and the class indication in a single memory entry or in consecutive entries of a single data structure.

6. The method according to claim 5, comprising determining the desired acceleration based on the equivalent of Newton's second law.

7. The method according to claim 1, wherein the autonomously driving the vehicle is executed under a control of an autonomous driving control unit that comprises one or more processing circuits.

8. A non-transitory computer readable medium for joint signature-virtual field representation of road elements for driving, the non-transitory computer readable medium stores commands executable by a processing circuit for: receiving, at a machine learning process associated with a vehicle, multiple sensed information units representing a road element captured at different points of time; generating, by the machine learning process, a joint representation of the road element that is a single unified representation that simultaneously encodes both a class indication of the road element and of a virtual field indication of an impact of the road element on the vehicle, wherein the virtual field indication represents a virtual force virtually applied by the road element on the vehicle based on a virtual physical model; wherein the class indication is distinguishable from the virtual field indication;

determining in real time in a driving of the vehicle, based on the joint representation, a driving related output affecting the vehicle, wherein the driving related output is a driving related decision with respect to the vehicle; wherein the determining of the driving related output comprises: (a) determining the virtual force virtually applied by the road element on the vehicle, (b) determining, based the virtual force, a virtual acceleration applied on the vehicle by the road element, (d) determining a desired acceleration of the vehicle based, at least in part, on the virtual acceleration applied on the vehicle by the road element, wherein the driving related output is used to have the vehicle autonomously drive at the desired acceleration; and autonomously driving the vehicle by executing the driving related decision.

9. The non-transitory computer readable medium according to claim 8, wherein the machine learning process being trained using a classification loss and a virtual field loss.

10. The non-transitory computer readable medium according to claim 8, that further stores instructions executable by a processing circuit for training the machine learning process to generate the joint representation.

11. The non-transitory computer readable medium according to claim 8, that further stores instructions executable by the processing circuit for ignoring the joint representation of the road element when the class indication indicates that the road element is of a given class that has an impact on the vehicle that does not match the impact on the vehicle that is indicated by the virtual field indication.

12. The non-transitory computer readable medium according to claim 8, comprising storing the virtual field indication and the class indication in a single memory entry or in consecutive entries of a single data structure.

13. The non-transitory computer readable medium according to claim 12, wherein the determining of the desired acceleration is based on the equivalent of Newton's second law.

14. The non-transitory computer readable medium according to claim 8, wherein the autonomously driving the vehicle is executed under a control of an autonomous driving control unit that comprises one or more processing circuits.

* * * * *